US011949337B2

(12) United States Patent
Hsu

(10) Patent No.: US 11,949,337 B2
(45) Date of Patent: Apr. 2, 2024

(54) FLYBACK POWER CONVERTER AND CONTROLLING METHOD OF THE SAME

(71) Applicant: PHIHONG TECHNOLOGY CO., LTD., Taoyuan (TW)

(72) Inventor: Ta-Ching Hsu, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 106 days.

(21) Appl. No.: 17/571,518

(22) Filed: Jan. 9, 2022

(65) Prior Publication Data

US 2023/0098275 A1 Mar. 30, 2023

(30) Foreign Application Priority Data

Sep. 24, 2021 (TW) ................. 110135531

(51) Int. Cl.
*H02M 3/335* (2006.01)
*H02M 1/34* (2007.01)
*H02M 1/00* (2006.01)
*H02M 1/44* (2007.01)

(52) U.S. Cl.
CPC ....... *H02M 3/33523* (2013.01); *H02M 1/344* (2021.05); *H02M 3/33569* (2013.01); *H02M 1/0009* (2021.05); *H02M 1/0032* (2021.05); *H02M 1/0058* (2021.05); *H02M 1/44* (2013.01)

(58) Field of Classification Search
CPC ............. H02M 1/0032; H02M 1/0058; H02M 1/0009; H02M 1/34–348; H02M 1/44; H02M 3/33507–33523; H02M 3/33569; H02M 3/33592
See application file for complete search history.

(56) References Cited

U.S. PATENT DOCUMENTS

| 5,414,342 A * | 5/1995 | Mammano | H02M 3/33507 323/288 |
|---|---|---|---|
| 2018/0309374 A1* | 10/2018 | Koo | H02M 3/33569 |
| 2019/0020277 A1* | 1/2019 | Liu | H03K 7/08 |
| 2019/0149052 A1* | 5/2019 | Gong | H02M 3/33592 363/21.07 |

* cited by examiner

*Primary Examiner* — Fred E Finch, III
(74) *Attorney, Agent, or Firm* — Chih Feng Yeh; Yongjan Consulting Inc.

(57) ABSTRACT

A flyback power converter includes a controller, a high-end driving circuit, an active clamp switch, a main switch and a zero current detection circuit. The high-end driving circuit is coupled to the controller. The active clamp switch is coupled to the high-end driving circuit for driving the active clamp switch. The main switch is coupled to the controller. The zero current detection circuit is coupled to the controller. The main switch and the active clamp switch are arranged on the primary side of a transformer. The switching period of a gate of the active clamp switch and the switching period of a gate of the main switch are controlled in reverse phase to achieve zero voltage or zero current conversion.

17 Claims, 6 Drawing Sheets

FLYBACK POWER CONVERTER AND CONTROLLING METHOD OF THE SAME

CROSS-REFERENCE TO RELATED APPLICATIONS

This patent application is based on, and claim priority from TAIWAN patent application serial number 110135531, filed on Sep. 24, 2021, the disclosure of which is hereby incorporated by reference herein in its' entirety.

TECHNICAL FIELD

The present invention relates to a power converter, especially relates to a flyback power converter with an active clamp and controlling method of the same.

BACKGROUND

In the field of power converters, a flyback power converter has been widely used to provide power to electronic products, such as household appliances, computers and battery chargers. However, the traditional active clamp circuit can only achieve high performance under heavy load, and the active clamp circuit will have the disadvantage of high power loss under light load due to the high circulating current.

Therefore, how to provide a novel flyback power converter to solve the above shortcomings has become an important topic.

SUMMARY

According to one aspect of the invention, it provides a flyback power converter and its controlling method to solve the problem of high RCD (resistance, capacitance, diode) clamping and switching loss caused by high-density miniaturized flyback power converter under high-frequency operation.

According to another aspect of the invention, it provides a flyback power converter, based on the switching action of a switching device under zero voltage or zero current, it is beneficial to miniaturize the product of flyback power converter and improve the overall efficiency of power supply. The flyback power converter of the invention can reduce the miniaturization cost and improve the efficiency.

In the invention, a flyback power converter includes a controller, a high-end driving circuit, an active clamp switch (switching device), a main switch (switching device) and a zero current detection circuit. The high-end driving circuit is coupled to the controller. The active clamp switch is coupled to the high-end driving circuit for driving the active clamp switch. The main switch is coupled to the controller. The zero current detection circuit is coupled to the controller. The main switch and the active clamp switch are arranged on the primary side of a transformer. The switching period (duty cycle) of a gate of the active clamp switch and the switching period (duty cycle) of a gate of the main switch are controlled in reverse phase to achieve zero voltage or zero current conversion.

In one embodiment, the zero current detection circuit comprises a diode, a capacitor and a first comparator, and a first output terminal of the first comparator is electrically coupled to the controller.

In one embodiment, the controller may be a digital signal processor integrated circuit, including a microprocessor, a microcontroller, or other similar integrated circuits.

According to one embodiment of the invention, the flyback power converter further comprises second comparator, an isolation circuit and a feedback circuit. The output terminal of the second comparator is coupled to the input terminal of the first comparator. The isolation circuit is electrically coupled to the feedback end of the controller. The feedback circuit is electrically coupled to the isolation circuit.

According to another aspect of the invention, a controlling method of a flyback power converter comprises generating a first control signal by a controller to turn on a main switching device. Next, a diode of a zero current detection circuit is conducted to generate a relative current to charge a capacitor when an output diode is detected to generate a current. Subsequentially, a second control signal is sent by an output terminal of a first comparator of the zero current detection circuit to control a demagnetization detection terminal voltage of the controller to be a first potential, and an output terminal of a high-end driver to be the first potential, to turn off an active clamp switching device. Finally, the main switching device is turned on as an output terminal of the controller is to be a second (high) potential greater than the first (low) potential.

DETAILED DESCRIPTION

Figure 1:
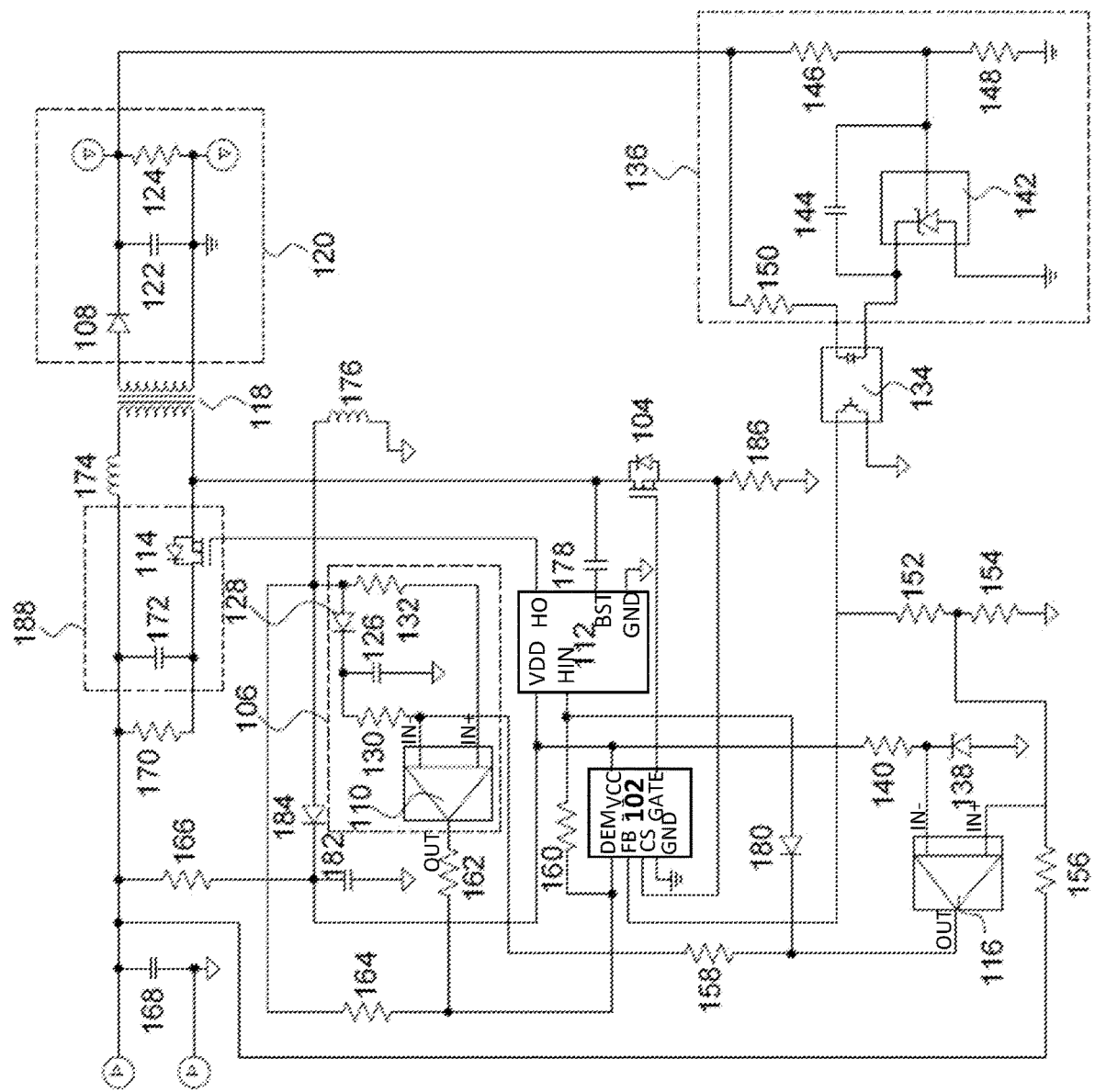
FIG. 1 shows a circuit diagram of a flyback power converter with an active clamp according to one embodiment of the present invention.

In order to give examiner more understanding of the features of the present invention and advantage effects which the features can be achieve, some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

An embodiment of the invention provides a flyback power converter and a controlling method thereof, in which the controlling method by a quasi resonant mode controller (QR mode IC) is used and the function of a zero current detection circuit is employed, and thereby converting to an active clamp flyback (ACF) control. Accordingly, the original control mechanism of quasi resonant mode controller is maintained at low output power, so as to achieve high efficiency of full output power. ACF is controlled by zero current detection at both ends of the diode, and the final control is achieved through continuous correction control for voltage and time by other special controllers (IC).

In operation, when operating under light load, an input terminal of an active clamp enabling circuit is coupled to a feedback-end to detect the voltage at the feedback-end as a control signal for whether the active clamping function is activated. An output terminal of the active clamp enabling circuit generates an active clamp enabling signal, which has the function of inputting voltage feedforward compensation, so that a stable load switching point can be obtained for high and low input voltages, and it takes into account the conditions of high and low input voltages to achieve the best efficiency performance.

According to a flyback power converter of an embodiment of the invention, the primary side of the zero current detection circuit has a diode, a capacitor and a first comparator. The output terminal of the zero current detection circuit generates a zero current enable signal to control the output terminal of a high-end driver in the quasi resonant mode to control the duty cycle of the active clamp switching device at the high-voltage end. The duty cycle of a gate of the active clamp switching device is reversely controlled with the duty cycle of a gate of a primary side main switching device, so as to achieve the purpose of zero voltage or zero current conversion.

A flyback power converter according to an embodiment of the invention comprises at least the following elements: a quasi resonant mode PWM controller, a primary side main switching device, a high-end driver, a primary side active clamp switching device, a transformer, a zero current detection circuit, an active clamp enabling circuit, a feedback circuit, an isolation circuit and a direct current (DC) output circuit. Pulse width modulation (PWM) is a technology that converts an analog signal into a pulse signal.

FIG. 1 illustrates a circuit architecture of a flyback power converter according to an embodiment of the present invention. The flyback power converter includes a quasi resonant mode PWM controller (circuit) 102 (hereinafter referred to as controller 102), a primary side main switching device 104 (hereinafter referred to as main switching device 104), a high-end (voltage side) driver 112, a primary side active clamp switching device 114 (hereinafter referred to as active clamp switching device 114), a transformer 118, a primary side zero current detection circuit 106 (hereinafter referred to as zero current detection circuit 106), an active clamp enabling circuit 188, a feedback circuit 136, an isolation circuit 134 and a DC output circuit 120. The active clamp enabling circuit 188 includes an active clamp switching device 114 and a capacitor 172. The high end (pressure side) drive circuit 112 is used to drive the active clamp switching device 114 of the active clamp enabling circuit 188. The zero current detection circuit 106 includes a diode 128, a capacitor 126, a first comparator 110, a resistor 130 and a resistor 132, wherein two input terminals of the first comparator 110 are electrically connected with a first end of the resistor 130 and a first end of the resistor 132 respectively, a second end of the resistor 130 is connected to the diode 128 and the capacitor 126, and a second end of the resistor 132 is connected to the diode 128. The output terminal of the first comparator 110 is electrically connected to the demagnetization detection terminal (DEM) of the controller 102. The resistor 162 is connected to the demagnetization detection terminal (DEM) of the controller 102 and the output terminal of the first comparator 110. The DC output circuit 120 includes an output diode 108, a capacitor 122, and a resistor 124, and the capacitor 122 is connected in parallel to the resistor 124. The feedback circuit 136 is a voltage stabilizing feedback circuit, including a zener diode 142, a voltage dividing resistors 146 and 148, a resistor 150 and a capacitor 144. In the circuit structure, the zener diode 142 is connected in parallel with the capacitor 144. One terminal of the voltage dividing resistor 148 is grounded, and the other terminal is connected in series with the voltage dividing resistor 146. The voltage dividing resistor 146 is coupled to a voltage output terminal. One terminal of the resistor 150 is electrically coupled to a first input terminal of a secondary side of the isolation circuit 134, and one terminal of the zener diode 142 is electrically coupled to a second input terminal on the secondary side of the isolation circuit 134.

Referring to FIG. 1, in order to implement the operation of the flyback power converter, it further includes the following components and the connection relationship: the front end of power feed-in includes a capacitor 168, a resistor 166 and a capacitor 182, and the resistor 166 is electrically coupled to the capacitor 182; a winding 176 is electrically coupled to a diode 184, and the diode 184 is electrically coupled to an input terminal (VDD) of the high-end driver 112; the resistor 160 is electrically coupled with another input terminal (HIN) of the high-end driver 112 and the demagnetization detection terminal (DEM) of the controller 102; the resistor 164 is electrically coupled to a positive input terminal (IN+) of the first comparator 110 and the input terminal of the controller 102; the output terminal (VCC) of the controller 102 is electrically coupled to the first terminal of the resistor 140, the first terminal of the resistor 140 is electrically coupled to the input terminal (VDD) of the high-end driver 112, and the second terminal of the resistor 140 is electrically coupled to the zener diode 138; a series resistors 152 and 154 are arranged between the controller 102 and the isolation circuit 134; a resistor 156 is connected between the resistor 152 and the resistor 154; an inverting input terminal (IN−) of the second comparator 116 is electrically coupled between the zener diode 138 and the resistor 140, a positive input terminal (IN+) of the second comparator 116 is electrically coupled to the resistor 156, and the output terminal of the second comparator 116 is electrically coupled to the inverting input (IN−) of the first comparator 110 through the resistor 158; a capacitor 178 is electrically coupled to the high-end driver 112; and a diode 180 is configured between the output terminal of the second comparator 116 and the input terminal (HIN) of the high-end driver 112.

Through the cooperative operation of the voltage stabilizing feedback circuit 136 and the isolation circuit 134, it can ensure that the output voltage of the flyback power converter does not exceed an upper limit value and the output voltage can stabilize at the target voltage level. In the circuit structure, the voltage stabilizing feedback circuit 136 is electrically coupled to the output terminal of the power converter. The isolation circuit 134 is electrically coupled between the voltage stabilizing feedback circuit 136 and the feedback terminal of the controller 102. When the output voltage is greater than the upper limit value, the zener diode 142 is reversely turned on to form a current loop, so that the current flows through the secondary side of the isolation circuit 134, and then turns on the primary side of the isolation circuit 134 to provide a feedback signal to the feedback terminal (FB) of the controller 102. When the output voltage is greater than the upper limit value, the voltage stabilizing feedback circuit 136 can output a feedback signal to the controller 102 through the isolation circuit 134, so that the controller 102 turns off the main switching device 104.

Referring to FIG. 1, the flyback power converter further includes a transformer 118, including a primary side winding and a secondary side winding. On the primary side of the transformer 118, the first terminal of the primary side winding is electrically coupled to the winding 174. The second terminal of the primary side winding of the transformer 118 is electrically coupled to the active clamp switching device 114 and the first terminal of the main switching device 104. The second terminal of the main switching device 104 is electrically coupled to the resistor 186, and the other terminal of the resistor 186 is connected to the grounding terminal. The output terminal (HO) of the high-end driver 112 is electrically coupled to the control terminal of the active clamp switching device 114 to output a control signal to selectively turn on or turn off the active clamp switching device 114. The controller 102 is electrically coupled to the control terminal of the main switching device 104 to output a first control signal to selectively turn on or turn off the main switching device 104. The secondary side and secondary side winding of the transformer 118 are electrically coupled to the output diode 108 to convert the DC voltage into the output voltage. On the other hand, the primary winding of the transformer 118 is sequentially connected in parallel with the capacitor 172 and the resistor 170, while the secondary winding is sequentially connected in parallel with the capacitor 122 and the resistor 124.

When the main switching device 104 is turned on, the primary side current will flow through the primary side winding of the transformer 118, so that the energy is stored in the primary side winding. Because the polarity of the primary side winding is opposite to that of the secondary side winding, the diode 108 in the secondary side circuit is under reverse bias voltage, and no energy is transferred to the load. The energy stored in the output capacitor 122 in the secondary side circuit of the power converter is provided for the output voltage required by the back-end circuit. When the main switching device 104 is turned off, the polarity on the primary side winding and the secondary side winding is reversed, so that the diode 108 is turned on, and the energy stored in the transformer 118 is transferred to the secondary side and output to the back-end circuit and the output capacitor 122. Since the ratio of power conversion is related to the turn number ratio and duty cycle of the transformer 118, the controller 102 can control the output voltage by adjusting the duty cycle of the control signal. In addition, switching on or off of the active clamp switching device 114 is controlled by the high-end driver 112.

As mentioned above, the diode 128 and the resistor 130 of the zero current detection circuit 106 are electrically connected to the inverting input terminal (IN−) of the first comparator 110, and the resistor 132 is electrically connected to the positive input terminal (IN+) of the first comparator 110. In one embodiment, controlling method of the flyback power converter includes the following operations. When the power supply reaches the gate voltage, the controller 102 is activated to generate an on-state signal to control the main switching device 104 to turn on. When a current is generated in the output diode 108, the diode 128 of the zero current detection circuit 106 simultaneously generates a relative current to charge the capacitor 126. On the contrary, when no current is generated (i.e., zero current) in the output diode 108, the diode 128 of the zero current detection circuit 106 also has zero current passing through. This synchronization signal just meets the detection signal required for active clamping control. The output terminal (OUT) of the first comparator 110 of the zero current detection circuit 106 sends a second control signal to control the demagnetization detection terminal (DEM) voltage of the controller 102 to be a low potential, and the output terminal (HO) of the high-end driver 112 to be the low potential, so as to close the active clamp switching device 114. At the same time, the output terminal (GATE) of the controller 102 is in a high potential, so that the main switching device 104 is turned on. The gate duty cycle of the main switching device 104 can be controlled according to the feedback. When the main switching device 104 is turned off, the conducting action of the output diode 108 and the diode 128 of the zero current detection circuit 106 is repeated to maintain the iterative action.

Figure 2:
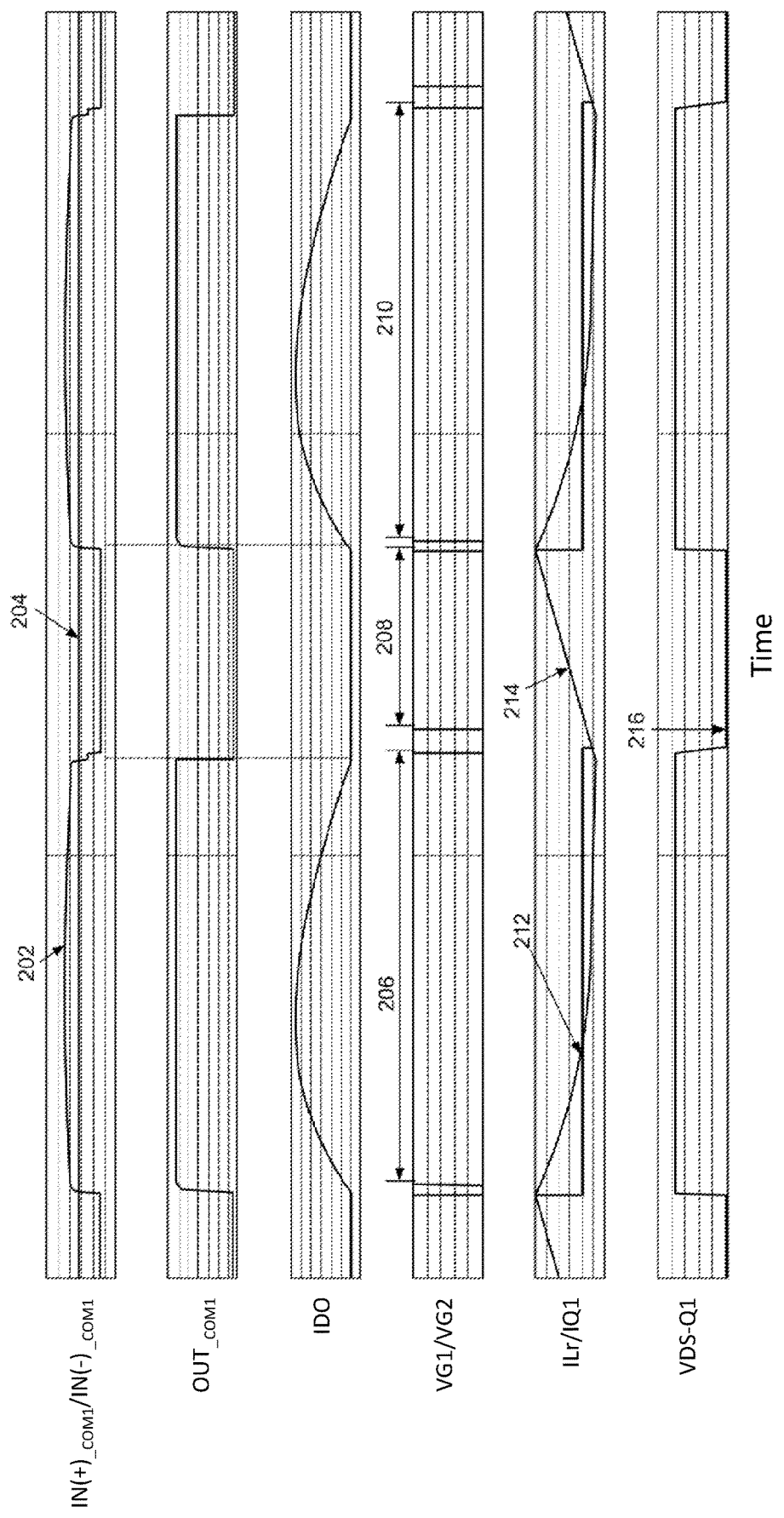
FIG. 2 shows a waveform diagram of an active clamping action according to one embodiment of the present invention.

Please refer to FIG. 2, it illustrates the waveform diagram of the active clamping action of one embodiment of the present invention. The following waveforms are represented from top to bottom: the positive input terminal (IN+)/the inverse input terminal (IN−) of the first comparator 110, the output terminal (OUT) of the first comparator 110, the output diode 108, and the gate voltage (VG1/VG2) of the main switching device 104, the primary side winding 174/the main switching device 104 (ILr/IQ1), the drain voltage (VDS-Q1) of the main switching device 104. The reference number 202 represents the waveform of the positive input terminal (IN+) of the first comparator 110, and the reference number 204 represents the waveform of the inverse input terminal (IN−) of the first comparator 110. The reference number 206 represents the waveform of the gate voltage (VG2_ON) of the main switching device 104, the reference number 208 represents the waveform of the gate voltage (VG1_ON) of the main switching device 104, and the reference number 210 represents the waveform of the gate voltage (VG2_ON) of the main switching device 104. The reference number 212 represents the waveform of the primary side winding 174, and the reference number 214 refers to the waveform of the main switching device 104. The reference number 216 stands for the waveform of the drain voltage (VDS-Q1) of the main switching device 104. As can be seen from the waveform of FIG. 2, the waveform of the output diode 108 on the secondary side shows that its on and off status occur at the zero current position, and the gate voltage (VG1) of the main switching device 104 is high. As the drain voltage (VDS-Q1) of the main switching device 104 is low such that the main switching device 104 is turned on at zero voltage, the switching loss of the main switching device 104 is greatly reduced due to the active clamping function in zero current, zero voltage. As can be seen from the waveform diagram, the drain voltage of the main switching device 104 does not have high-frequency ringing wave of the traditional flyback, and the electromagnetic interference (EMI) is relatively slight. Since the main switching device 104 is turned on at zero voltage, the main switching device 104 of the present invention eliminates the traditional spike current generated by instantaneously initiating. Therefore, the present invention does not only reduce loss and improve efficiency, but also greatly reduces the electromagnetic interference (EMI).

Figure 3:
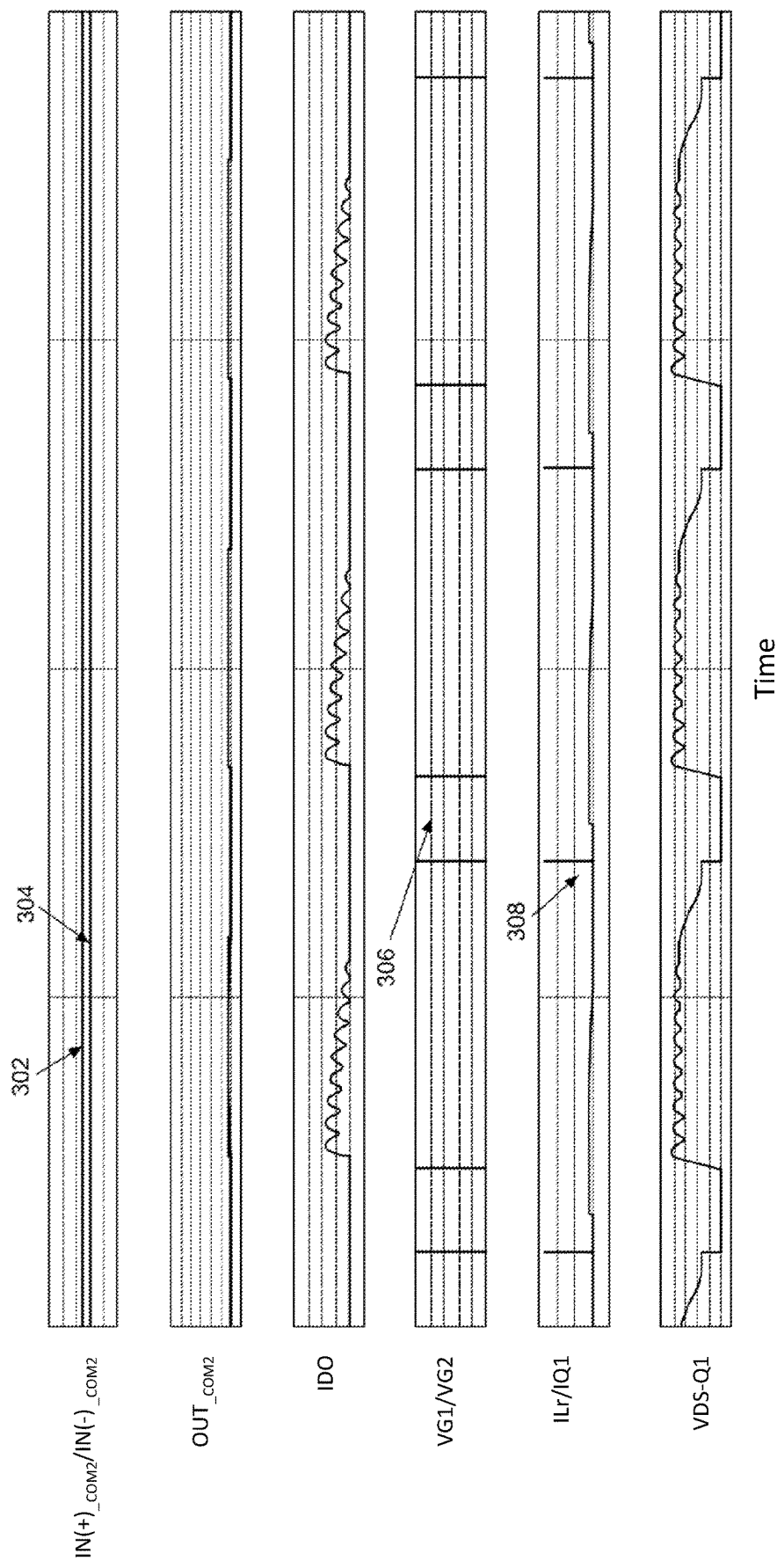
FIG. 3 shows a waveform diagram of closing an active clamping action in light-load according to one embodiment of the present invention.

Please refer to FIG. 3, it shows the waveform diagram embodiment of turning off the active clamping in light load. The waveform below is represented from top to bottom: the current waveform 202 of the positive input terminal (IN+) of the second comparator 116/the waveform 204 of the inverse input terminal (IN−) of the second comparator 116, and the output terminal (OUT) of the second comparator 116, the output diode 108, the gate voltage (VG1/VG2) of main switching device 104, the primary side winding 174/the main switching device 104 (ILr/IQ1), and the drain voltage (VDS-Q1) of the main switching device 104. The reference number 302 represents the waveform of the positive input terminal (IN+) of the second comparator 116, and the reference number 304 stands for the waveform of the inverse input terminal (IN−) of the second comparator 116. The reference number 306 refers to the waveform of the gate voltage (VG1_ON) of the main switching device 104. The reference number 308 represents the waveform (ILr=IQ1) of the primary side winding 174. From the waveform of FIG. 3, it can be seen that the voltage at the inverse input terminal (IN−) of the second comparator 116 is higher than that at the positive input terminal (IN+) thereof. At this time, the output terminal (OUT) of the second comparator 116 is at the low level and the active clamping function is turned off, so that the flyback power converter returns to the quasi resonant working mode to reduce the loss of excitation current.

Figure 4:
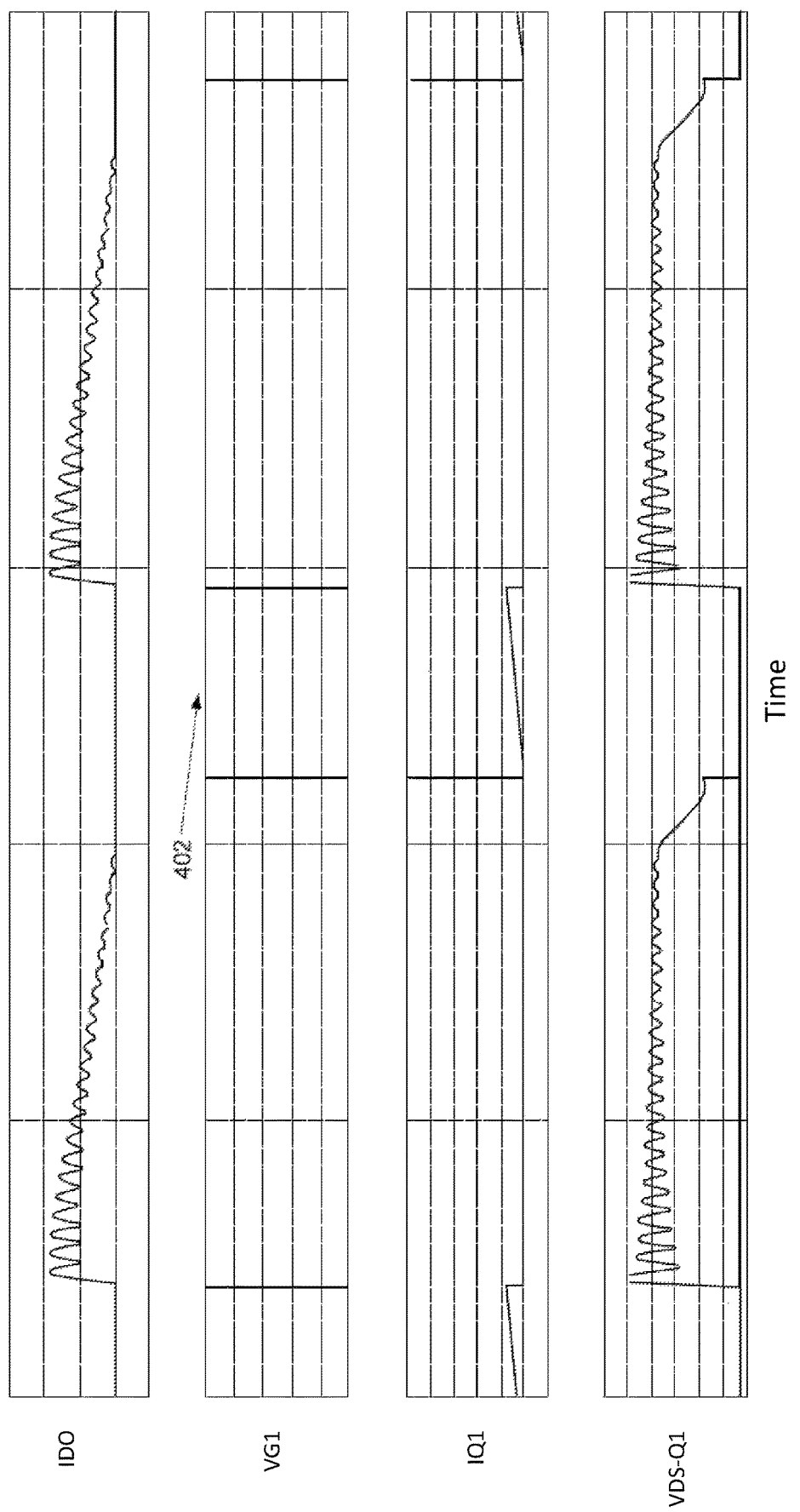
FIG. 4 shows a waveform diagram of a conventional quasi resonant action.

Please refer to FIG. 4, it shows a waveform diagram of a well-known quasi resonant action. The waveform from top to bottom respectively represents the following: the output diode, the gate voltage (VG1) of the main switching device, the main switching device (IQ1), the drain voltage (VDS-Q1) of the main switching device. The reference number 402 represents the waveform of the gate voltage (VG1_ON) of the main switching device. It can be seen from the waveform of FIG. 4 that the current and voltage waveforms of the output diode and the main switching device show that they are turned on in a non-zero current and non-zero voltage state. In addition, there are high-frequency ringing waves on the drain voltage (VDS_Q1) of the main switching device and the output diode current (IDO) waveforms, so the electromagnetic interference (EMI) will be generated, which will affect the output efficiency. This shows that the flyback power converter disclosed in the embodiment of the present invention is superior to the well-known flyback power converter.

Figure 5:
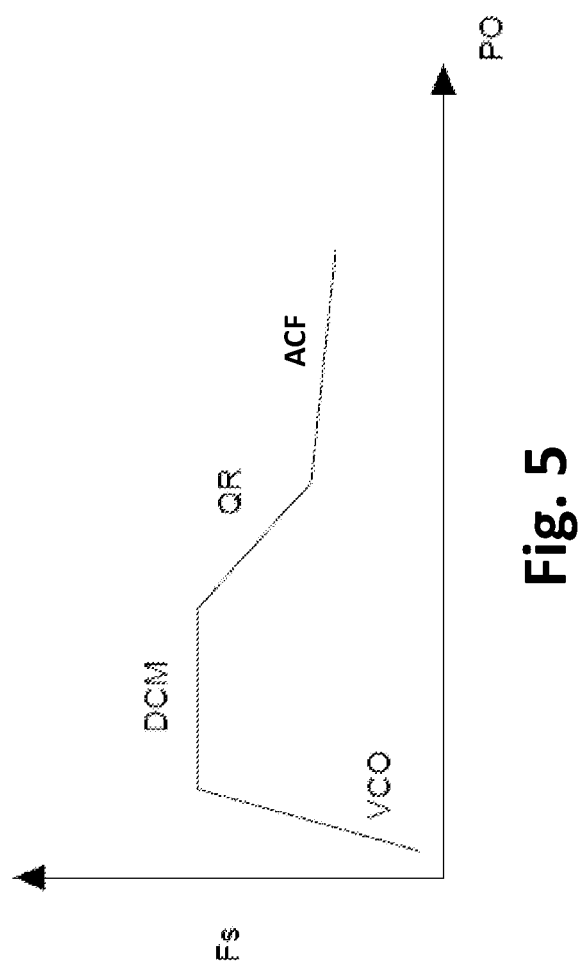
FIG. 5 shows a relationship diagram between operating frequency of active clamp type and power output.

Please refer to FIG. 5, it illustrates the relationship between the working frequency of multimode control and the output power in one embodiment of the present invention. The vertical axis FS represents the working frequency, and the horizontal axis PO (Power Output) represents output power. QR (Quasi Resonant) represents a quasi resonant mode, DCM (discontinuous conduction mode) represents a discontinuous current mode, and VCO (Voltage Control Oscillator) indicates a voltage controlled frequency reduction mode, while ACF (Active Clamp Flyback) indicates an active clamp flyback mode. As compared with the well-known quasi resonant mode, an embodiment of the invention proposes an active clamp mode. The ACF mode (active clamp flyback mode) is introduced into the present invention, and thereby greatly improving the power efficiency.

Figure 6:
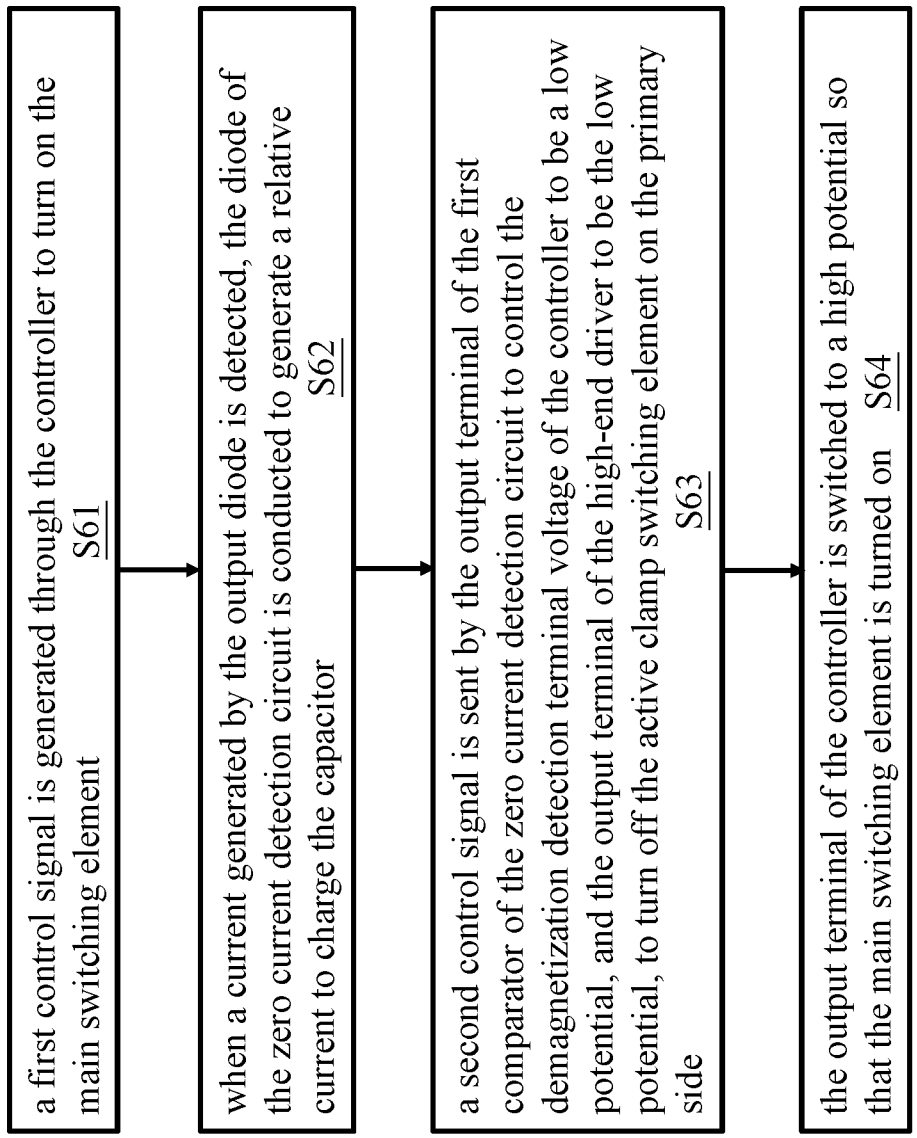
FIG. 6 shows a flow chart of a method of controlling a flyback power converter according to one embodiment of the present invention.

Please refer to FIG. 6, it illustrates the flow chart of controlling method of a flyback power converter according to one embodiment of the present invention. The controlling method of the flyback power converter according to this embodiment includes the following steps:

In step S61, a first control signal is generated through the controller to turn on the main switching device.

In step S62, when a current generated by the output diode is detected, the diode of the zero current detection circuit is conducted to generate a relative current to charge the capacitor.

In step S63, a second control signal is sent by the output terminal of the first comparator of the zero current detection circuit to control the demagnetization detection terminal voltage of the controller to be a low potential, and the output terminal of the high-end driver to be the low potential, to turn off the active clamp switching device on the primary side.

In step S64, the output terminal of the controller is switched to a high potential so that the main switching device is turned on.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

What is claimed is:

1. A flyback power converter, comprising:
a controller;
a high-end driving circuit coupled to said controller;
an active clamp switching device coupled to said high-end driving circuit to drive said active clamp switching device;
a main switching device coupled to said controller and driven by said controller; and
a zero current detection circuit including a first comparator, and a first output terminal of said first comparator being electrically coupled to said controller to detect current information of a DC output circuit coupled to a secondary side of a transformer;
a second comparator having an output terminal coupled to a first input terminal of said first comparator;
wherein said high-end driving circuit drives said active clamp switching device in response to said current information;
wherein said zero current detection circuit outputs a control signal through said first comparator based on said current information of an output diode of said DC output circuit to control demagnetization terminal voltage of said controller to drive said high-end driving circuit, wherein said main switching device is controlled by said controller with reverse phase of said control signal; and
wherein a first duty cycle of a first gate of said active clamp switching device and a second duty cycle of a second gate of said main switching device are controlled in reverse phase.

2. The flyback power converter of claim 1, wherein said active clamp switching device and said main switching device are configured in a primary side of said transformer.

3. The flyback power converter of claim 1, wherein said zero current detection circuit further comprises a diode, a capacitor, and said first output terminal of said first comparator is electrically coupled to said controller.

4. The flyback power converter of claim 3, wherein said zero current detection circuit further comprises a first resistor and a second resistor.

5. The flyback power converter of claim 4, wherein two input terminals of said first comparator are electrically connected with a first end of said first resistor and a second end of said second resistor respectively.

6. The flyback power converter of claim 5, wherein a second end of said first resistor is coupled to said diode and said capacitor, and a first end of said second resistor is coupled to said diode.

7. The flyback power converter of claim 3, wherein said output terminal of said first comparator is coupled to a demagnetization detection terminal of said controller.

8. The flyback power converter of claim 1, further comprising an isolation circuit electrically coupled to a feedback end of said controller.

9. The flyback power converter of claim 8, further comprising a feedback circuit electrically coupled to said isolation circuit.

10. A controlling method of a flyback power converter, comprising:
generating a first control signal by a controller to turn on a main switching device;
conducting a diode of a zero current detection circuit to generate a relative current to charge a capacitor when a current generated by an output diode is detected;
sending a second control signal by an output terminal of a first comparator of said zero current detection circuit to control a demagnetization detection terminal voltage of said controller to be a first potential, and an output terminal of a high-end driver to be said first potential, to turn off an active clamp switching device; and
turning on said main switching device as an output terminal of said controller is switched to a second potential greater than said first potential;
wherein said output terminal of said first comparator is electrically coupled to said controller, and a second comparator having an output terminal is coupled to a first input terminal of said first comparator.

11. The method of claim 10, wherein said active clamp switching device and said main switching device are configured in a primary side of a transformer.

12. The method of claim 10, wherein said zero current detection circuit further comprises a first resistor and a second resistor.

13. The method of claim 12, wherein two input terminals of said first comparator are electrically connected with a first end of said first resistor and a second end of said second resistor respectively.

14. The method of claim 13, wherein a second end of said first resistor is coupled to said diode and said capacitor, and a first end of said second resistor is coupled to said diode.

15. The method of claim 10, wherein an output terminal of said first comparator is coupled to a feedback end of said controller.

16. The method of claim 10, further comprising an isolation circuit electrically coupled to a feedback end of said controller.

17. The method of claim 16, further comprising a feedback circuit electrically coupled to said isolation circuit.

* * * * *